United States Patent [19]
Braun et al.

[11] Patent Number: 5,089,934
[45] Date of Patent: Feb. 18, 1992

[54] ELECTRICAL SWITCHGEAR HAVING AN INSERTABLE AND RETRACTABLE APPARATUS RACK

[75] Inventors: Bodo Braun, Offenbach; Christian Bruszies, Ostfildern; Manfred Feuerbach, Frankfurt; Rolf-Guenter Genzel, Luetzelbach/odw; Josef Lobnig, Herzogenaurach; Juergen Raddatz, Frankfurt, all of Fed. Rep. of Germany

[73] Assignee: Siemens Aktiengesellschaft, Berlin and Munich, Fed. Rep. of Germany

[21] Appl. No.: 615,591

[22] Filed: Nov. 19, 1990

[30] Foreign Application Priority Data

Nov. 24, 1989 [DE] Fed. Rep. of Germany ....... 3939355

[51] Int. Cl.$^5$ .............................. H02B 1/10; H01H 9/20
[52] U.S. Cl. .............................. 361/335; 200/50 AA; 361/339; 361/391; 439/259
[58] Field of Search .............. 439/251, 259, 262; 200/51 R, 50 AA, 50 R B, 529, 564, 566; 361/335–339, 342, 343, 376, 390, 391, 426, 429

[56] References Cited

U.S. PATENT DOCUMENTS

| | | | |
|---|---|---|---|
| 4,236,189 | 11/1980 | Yosida | 361/337 |
| 4,668,035 | 5/1987 | Jego | 200/50 AA |
| 4,703,137 | 10/1987 | Bohnen | 200/50 AA |
| 4,743,715 | 5/1988 | Gaillard | 200/50 AA |
| 4,984,383 | 1/1991 | Mummey | 439/259 |

FOREIGN PATENT DOCUMENTS

1943468  8/1966  Fed. Rep. of Germany .

Primary Examiner—Gerald P. Tolin
Attorney, Agent, or Firm—Kenyon & Kenyon

[57] ABSTRACT

A switchgear has insertable and retractable apparatus racks, which are to be connected by means of break-contact devices to supplying busbars and to outgoing conductors. The busbars are configured to lie one behind the other in a moving direction during insertion and retraction of the apparatus rack. Both break-contact configurations are simultaneously actuated by means of a mutual driving arrangement, for example, a shaft, pinions and gear racks. The result is that when the break-contact configurations are closed, the apparatus rack is mechanically blocked in a reliable manner so that it cannot become displaced.

8 Claims, 2 Drawing Sheets

ELECTRICAL SWITCHGEAR HAVING AN INSERTABLE AND RETRACTABLE APPARATUS RACK

BACKGROUND OF THE INVENTION

The present invention relates to an electrical switchgear having an insertable and retractable apparatus rack and having break-contact devices for detachably connecting the main circuits of the switching devices situated on the apparatus rack, with conductors, used for the incoming supply, permanently arranged in the switchgear, whereby the actuating direction of the break-contact devices during insertion and retraction is provided perpendicularly to the moving direction of the apparatus rack.

A switchgear of this type is disclosed in DE-U-1 943 468. In this switchgear, the break-contact devices serve to connect the switching devices on the apparatus rack to stationary busbars. The movable parts of the break-contact devices are designed as isolating blades that are pivoted on the apparatus rack. These isolating blades interact with busbars. Which are configured on the side of the apparatus rack and lie vertically, one behind the other, in the slide-in direction. Additional break-contact configurations are provided for the outgoing-circuit connecting terminals of the apparatus rack and are situated on the back side of the apparatus rack.

Without introducing any special measures, the lateral engagement of the incoming-side break-contact devices with the busbars causes the slide-in action of the device to be blocked in the voltage-carrying state against the movement of the apparatus rack on its guide pieces in the switchgear. Nevertheless, in practice, one cannot refrain from using additional mechanical blocking devices, because as a result of the one-sided engagement of the isolating blades with the busbar configuration, the danger exists that careless operation could cause the apparatus rack to tilt in its guidance and could also damage the interacting parts.

SUMMARY OF THE INVENTION

It is an object of the invention to provide a reliable blocking of the apparatus rack in the inserted state, that is in the state in which the supplying busbars are connected, while avoiding the necessity of additional mechanical locking parts.

The above and other objects of the invention are achieved by an electrical switchgear having an insertable and retractable apparatus rack and having disconnect contact means for detachably connecting supply main circuits of switching means disposed on the apparatus rack, with incoming supply conductors permanently arranged in the switchgear, the disconnect contact means having an actuating direction, the actuating direction of the disconnect contact means during insertion and retraction being provided perpendicularly to a moving direction of the apparatus rack, disconnect contact means further being provided for connecting the switching means to outgoing circuits, the disconnect contact means for the outgoing circuits having an actuating direction running perpendicularly to the moving direction of the apparatus rack during insertion and retraction. In this manner, the apparatus rack is locked at an additional point, which virtually rules out any tilting of the apparatus rack and any resulting damages.

To securely retain the locking of the apparatus rack in its guidance, it has an advantageous effect when the supplying busbars and the stationary parts of the outgoing-circuit break-contact devices are configured on opposite sides of the apparatus rack. In this manner, wide apparatus racks can also be reliably retained in the inserted position.

On the other hand, within the scope of the invention, the break-contact devices on the busbar side and the ones in outgoing circuit can be mounted on the upper side of the apparatus rack. This configuration is especially suited for apparatus racks whose height is not very great relative to their width.

An equally favorable effect results for the operation and desired safety, when both break-contact devices are able to be actuated by a mutual final controlling element. This guarantees that both the electrical connection and the mechanical connection are produced at the same time.

To attain the simultaneous movements, one can provide for a pinion connected to the final controlling element as well as gear racks connected to the moveable parts of the break-contact devices. This configuration is suited for apparatus racks, upon which the break-contact devices are installed on opposite sides or for those that are installed together on the upper side of the apparatus rack. In the one case, the gear racks are then situated on opposites sides of the pinion, while in the secondly named case they engage with the pinion on the same side as the pinion.

BRIEF DESCRIPTION OF THE DRAWINGS

The invention will be described in greater detail in the following detailed description with reference to the drawings, in which.

DETAILED DESCRIPTION

Figure 1:
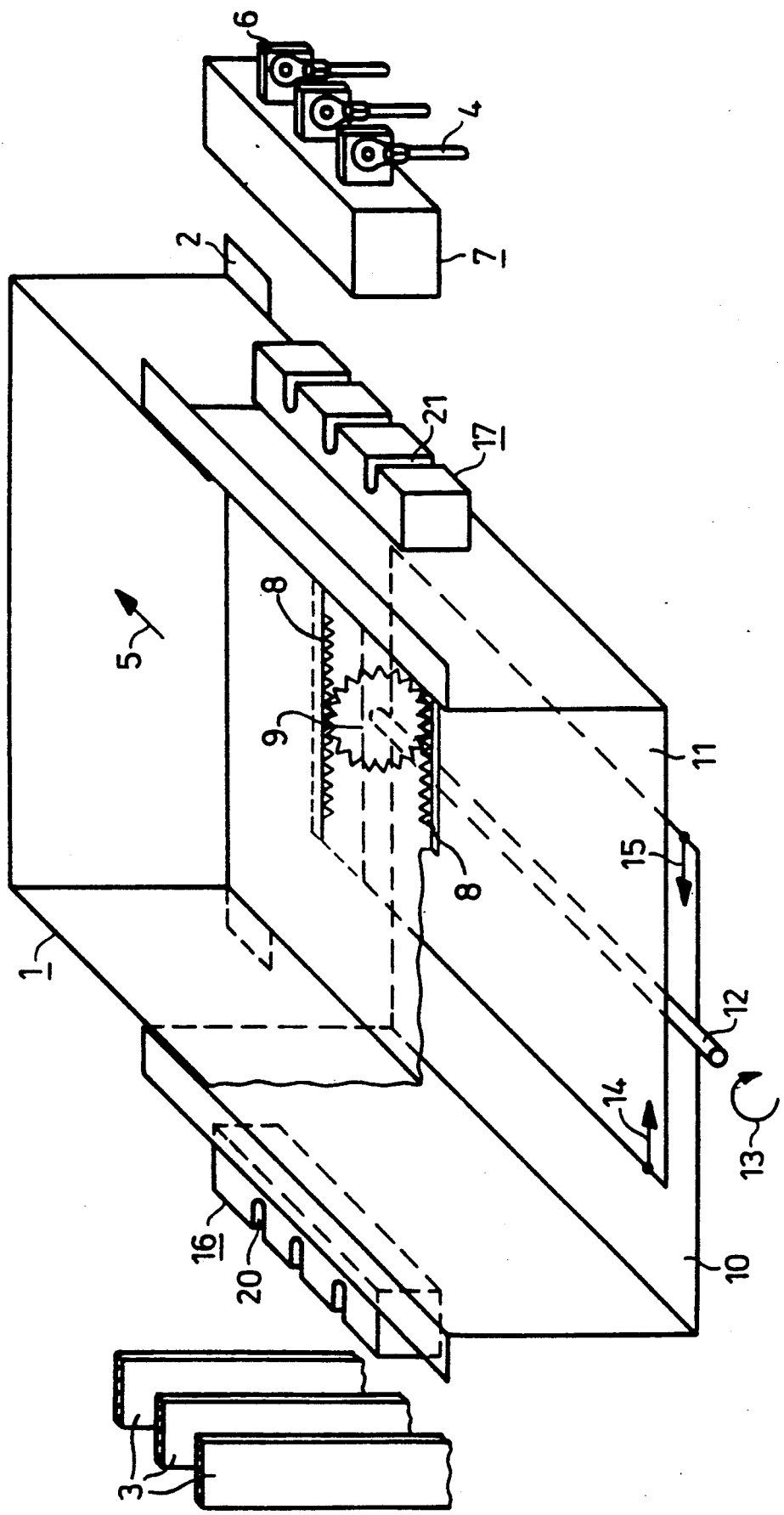
FIG. 1 schematically illustrates an apparatus rack with two break-contact devices configured on opposite sides and with a mutual actuating device for the movable parts.

With reference now to the drawings, the apparatus rack 1 shown in FIG. 1 has lateral guide crosspieces 2 that are provided for insertion into corresponding stationary counterparts in a control cabinet or a switching station. The switching devices, control and measuring instruments to be accommodated on the apparatus rack 1 are not shown, because they are not necessary to understand the invention, and these types of device configurations, for example, for motor control cabinets, are generally known. The mentioned switching devices are situated in the wiring run between the supplying busbars 3 and the outgoing circuit lines or cables 4, which are shown on the right side of the apparatus rack, but could also be on the left side. The busbars 3 are configured to lie one behind the other in the direction of movement of the apparatus rack 1 characterized by an arrow 5 during the insertion into the switchgear. In the same way, the outgoing-circuit cables 4 on the right side of the apparatus rack 1 have a fixed configuration and lie one behind the other. In the representation of FIG. 1, one starts from the assumption that the three busbars 3 are supported in a fixed manner on insulating holders. In the same way, connecting pieces 6 that are connected to the cables 4 are secured in a fixed break-contact unit 7 with a housing of insulating material.

On the apparatus rack 1, a configuration is disposed which has two oppositely movable slides 10 and 11. For their simultaneous actuation, an accessible shaft 12 is provided at the front side of the apparatus rack 1. The shaft 12 can be provided with a pinion 9, which interacts respectively with one gear rack 8, which is mounted at the slide 10 and at the slide 11 in such a way that one of the gear racks 8 engages into one side of the pinion 9 and into the gear rack 8 on the opposite side of the pinion 9. One rotation of the shaft 12 in the sense of the arrow 13 therefore effects an oppositely directed movement of the slides 10 and 11 in the direction of the arrows 14 and 15. In dependence upon the size of the parts, two or more pinions 9 and a corresponding number of gear racks 8 a can also be provided on the shaft 12.

The movement of the slides 10 and 11 relative to the apparatus rack 1 serves to actuate break-contact devices. These break-contact devices are formed as a stationary part for the incoming supply out of the busbars 3 and as a movable part for the incoming supply out of a break-contact unit 16. The stationary break-contact unit 7 and a movable break-contact unit 17 are provided for the outgoing circuit. Since numerous constructions are already known of contacts that are designed to be brought into engagement with each other, the details of such are not shown in FIG. 1. One can recognize, however, that the contact blocks 16 and 17 are provided with respective recesses or indentations 20, 21, to accommodate the stationary mating contacts. As a result, in addition to the electrical connection, a mechanical locking is also achieved at the stationary mating contacts. In this manner, the apparatus rack 1 is reliably blocked so that it cannot be displaced out of its operating position.

Figure 2:
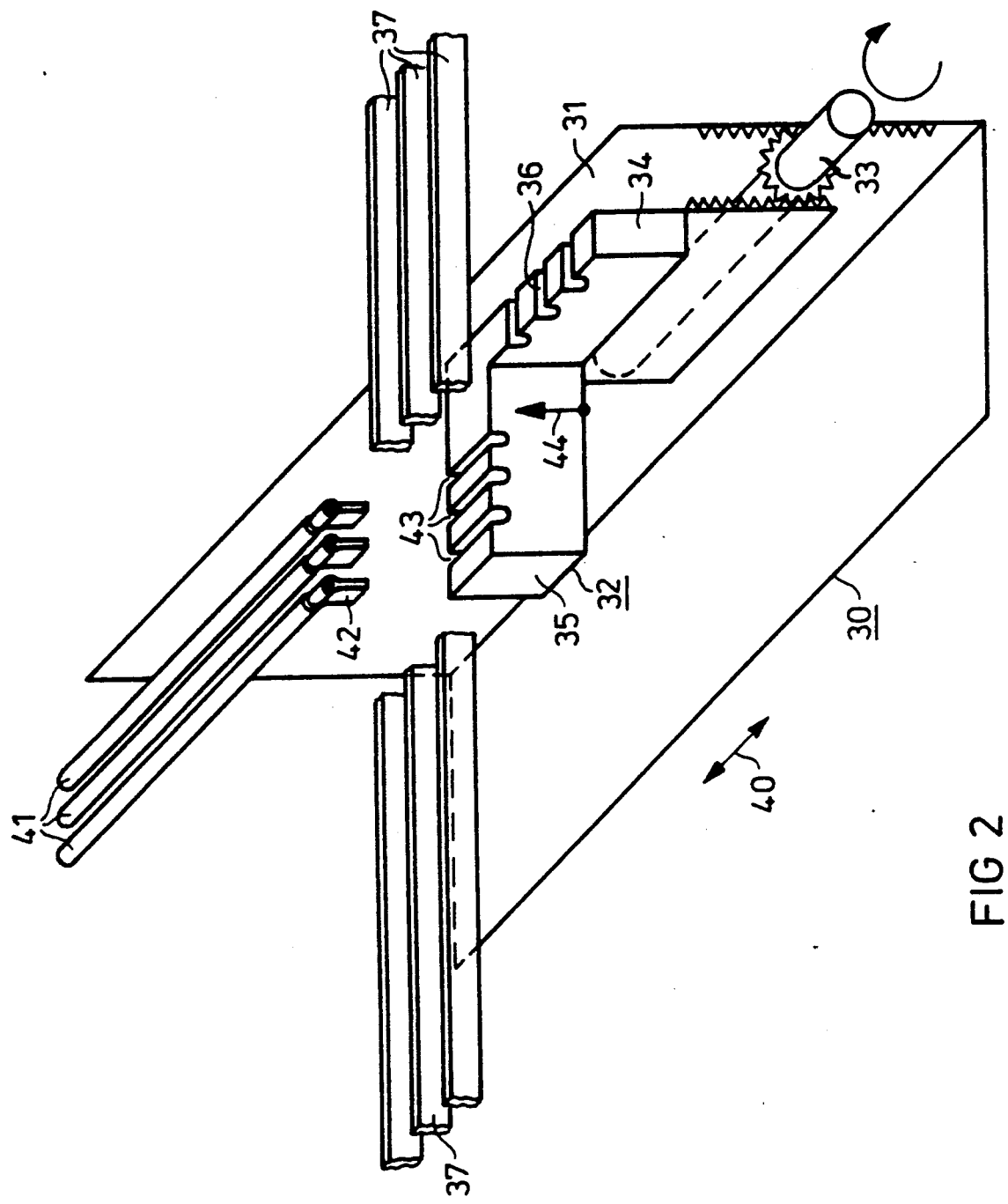
FIG. 2 also shows a schematic, perspective representation, of an apparatus rack with two break-contact devices mounted on the upper side of the apparatus rack.

Another example of locking an apparatus rack in its operating position is shown by FIG. 2. In this figure, the apparatus rack is schematically depicted as a gusset 30. At its right side wall 31, an angular break-contact unit 32 is guided so that it is vertically movable in a sliding manner. The displacement in the vertical direction can be achieved in the manner already described by means of a gear rack 8 in connection with a pinion 9 and a shaft 33. The angular break-contact unit 32 features a segment 34 extending parallel to the side wall 31 of the apparatus rack 30 as well as an additional segment 35 which juts out at right angles from this. Of these, the segment 34 is provided with cuts 36 for crossing over of busbars 37, which are arranged to run perpendicularly to the slide-in direction, characterized by an arrow 40, of the apparatus rack 30, above the apparatus rack. Outgoing conductors 41, Which have angular contacts 42 attached to their front ends, extend more or less in the same plane as the busbar conductors 37, however at right angles to them. These contacts engage with recesses 43 on segment 35 of the break-contact unit 32.

If the break-contact unit 32 is shifted in the direction of the arrow 44 by means of the shaft 33, then the contacts situated in segments 34 and 35 of the break-contact unit 32 become simultaneously engaged with the busbars 37 and with the contacts 42. In this example as well, the apparatus rack 30 is secured so that it cannot be pulled out of its operating position, because both the busbars 37 as well as the contacts 42 of the outgoing conductors 41 form a mechanical blocking device.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An electrical switchgear comprising:
   a) an insertable and retractable apparatus rack for insertion into and retraction from a cabinet, said insertable and retractable apparatus rack supporting a switching device having main supply circuits;
   b) a plurality of incoming supply contacts for contracting incoming supply conductors;
   c) a first disconnect contact means mounted on said insertable and retractable apparatus rack for detachably connecting the main supply circuits via said plurality of incoming supply contacts to the plurality of incoming supply conductors, said fist disconnect contact means having a first actuating direction which is perpendicular to a moving direction of said insertable and retractable apparatus rack during insertion and retraction in the cabinet, wherein said plurality of incoming supply contacts are mounted on said first disconnect contact means;
   d) a plurality of outgoing circuit contacts for contacting outgoing circuits; and
   e) a second disconnect contact means mounted on said insertable and retractable apparatus rack for connecting the switching device via said plurality of outgoing circuit contacts to the outgoing circuits, said second disconnect contact means having a second actuating direction perpendicular to said moving direction and which is parallel but opposite in direction to said first actuating direction, wherein said plurality of outgoing circuit contacts are mounted on said second disconnect contact means.

2. The switchgear according to claim 1, wherein said plurality of outgoing circuit contacts are disposed oppositely from said plurality of supply contacts.

3. The switchgear according to claim 1, wherein said first disconnect contact means further comprises a first upper side, said second disconnect contacts means further comprises a second upper side, and said plurality of incoming supply contacts and said plurality of outgoing circuit contacts are mounted on said first and second upper sides, respectively.

4. The switchgear according to claim 1, further comprising a mutual controlling means coupled to said first and second disconnect contact means for actuating said first and second disconnect contact means.

5. The switchgear according to claim 2, further comprising a mutual controlling means coupled to said first and second disconnect contact means for actuating said first and second disconnect contact means.

6. The switchgear according to claim 5, further comprising a means for providing simultaneous movements to said first and second disconnect contact means coupled to said mutual controlling means.

7. The switchgear according to claim 6, wherein said first disconnect contact means further comprises a first slidable element, said means for providing simultaneous movements comprises a pinion coupled to said mutual controlling means, and a first gear rack mounted on said first slidable element engaging said pinion, whereby said mutual controlling means causes said pinion to rotate thus moving said first slidable element and causing said plurality if incoming supply contacts to contact the incoming supply conductors.

8. The switchgear according to claim 7, wherein said second disconnect contact means further comprises a second slidable element, said means for providing simultaneous movements further comprises a second gear rack mounted on said second slidable element engaging said pinion, whereby rotation of said pinion moves said second slidable element causing said plurality of outgoing circuit contacts to contact the outgoing circuits.

* * * * *